United States Patent [19]

Lerner

[11] Patent Number: 4,646,201
[45] Date of Patent: Feb. 24, 1987

[54] FLUORESCENT LIGHT MOUNTING SYSTEM

[76] Inventor: David R. Lerner, 290 Collins Ave., Mount Vernon, N.Y. 10552

[21] Appl. No.: 681,936

[22] Filed: Dec. 14, 1984

[51] Int. Cl.$^4$ .............................................. H02B 1/10
[52] U.S. Cl. ............................ 361/377; 174/DIG. 2; 362/427
[58] Field of Search ................... 361/377; 362/8, 225, 362/427; 174/DIG. 2

[56] References Cited

U.S. PATENT DOCUMENTS 2,422,280  6/1947  Abernathy ..................... 362/427 X
2,917,619  12/1959  Petrick .................................... 362/8

Primary Examiner—A. D. Pellinen
Assistant Examiner—Morris Ginsburg
Attorney, Agent, or Firm—Lackenbach Siegel Marzullo & Aronson

[57] ABSTRACT

An ultrahighlight fluorescent light mounting system for filming, particularly in color. A head carries the fluorescent tubes and a removable light shield while the ballast is positioned in a container remote from the head. The head is set upon and swivable about an upper post, which is rotatably connected to a lower post, which in turn is set upon and swivable about a swivel piece extending from a standard stand. The head, light shield, first post, second post, stand, and ballast can all be dissembled from one another and placed in carrying cases.

7 Claims, 14 Drawing Figures

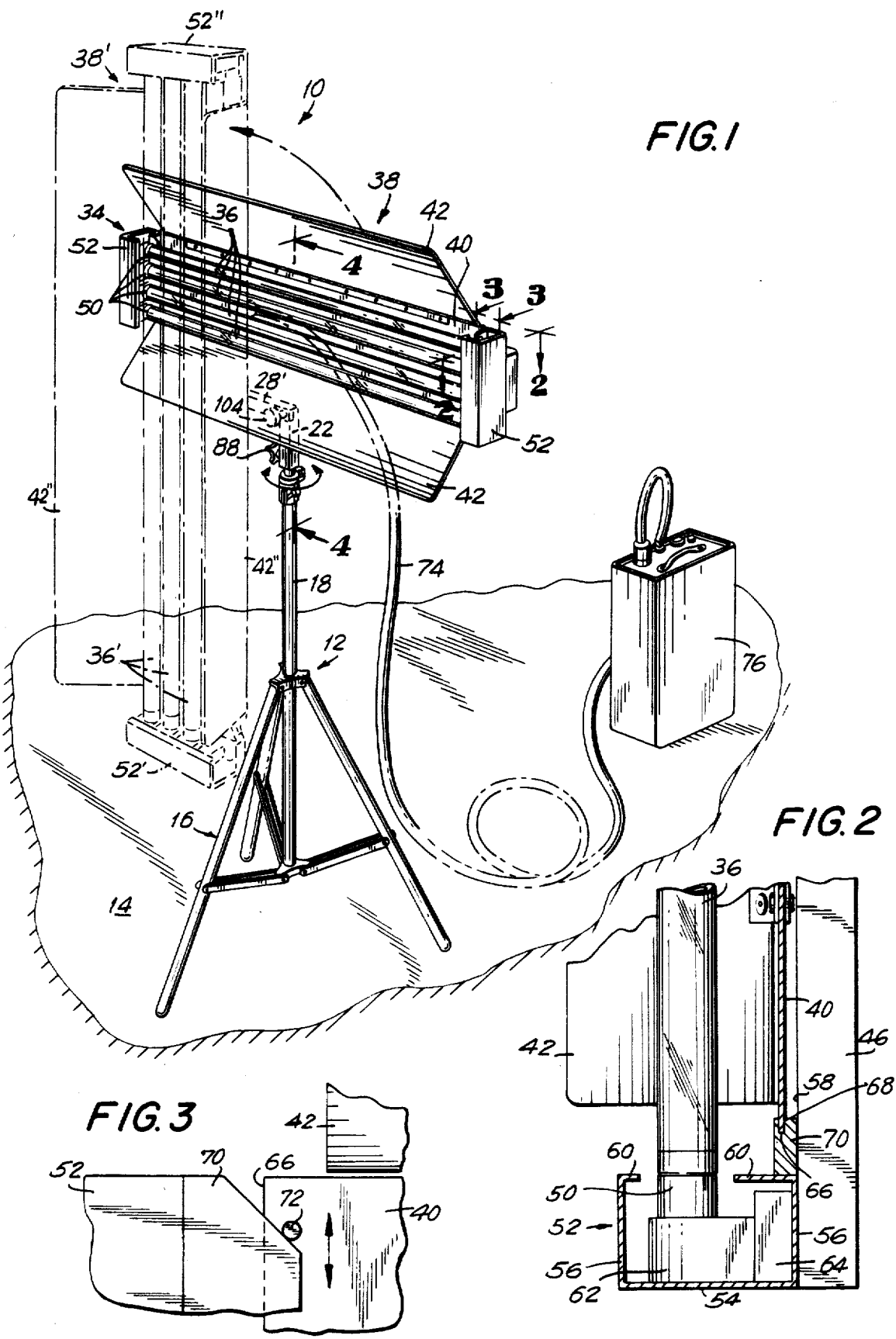

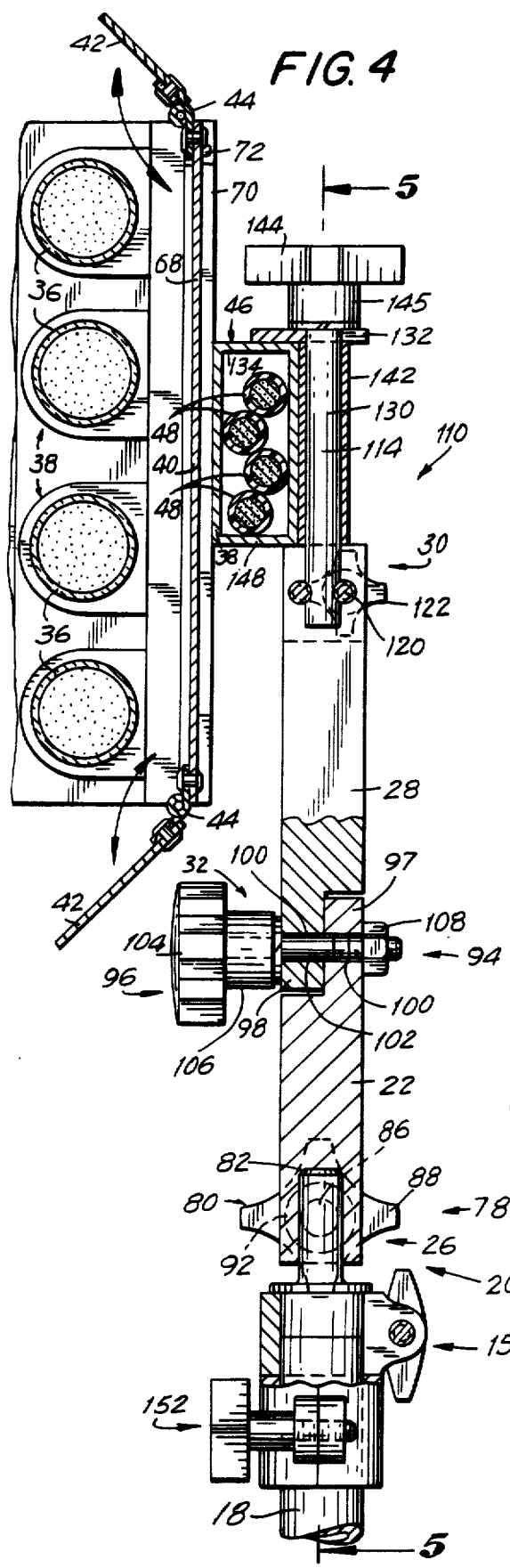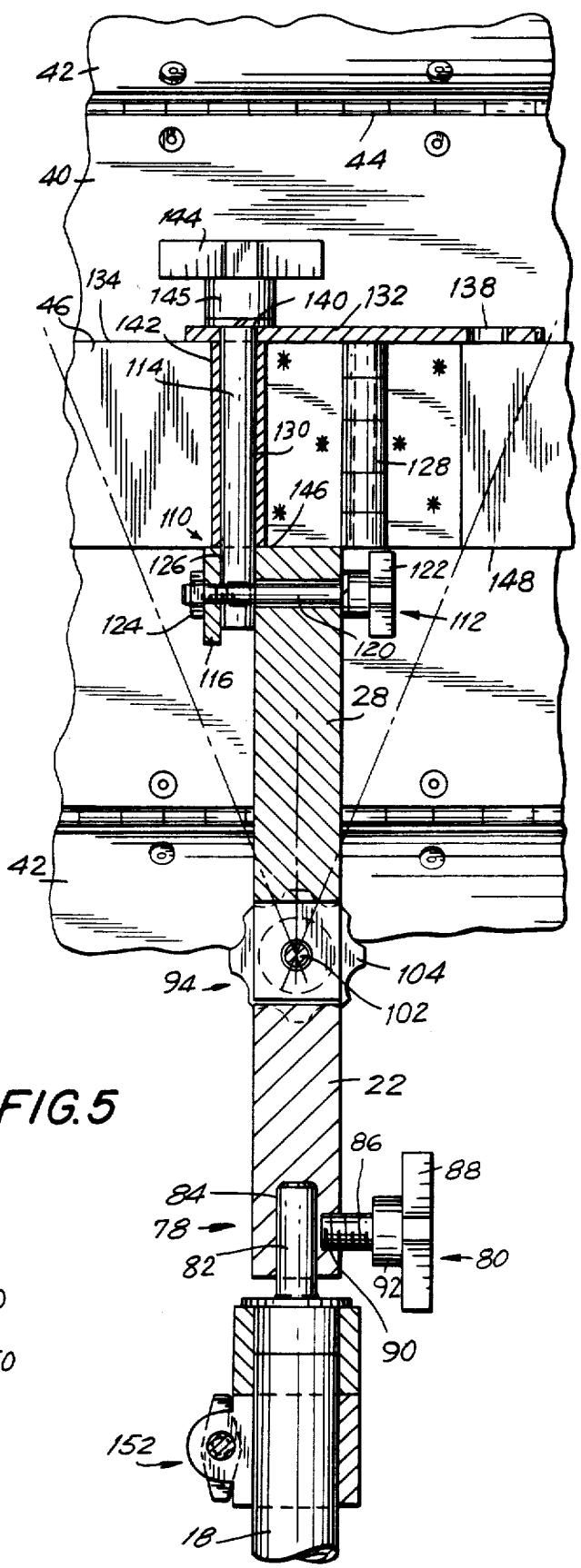

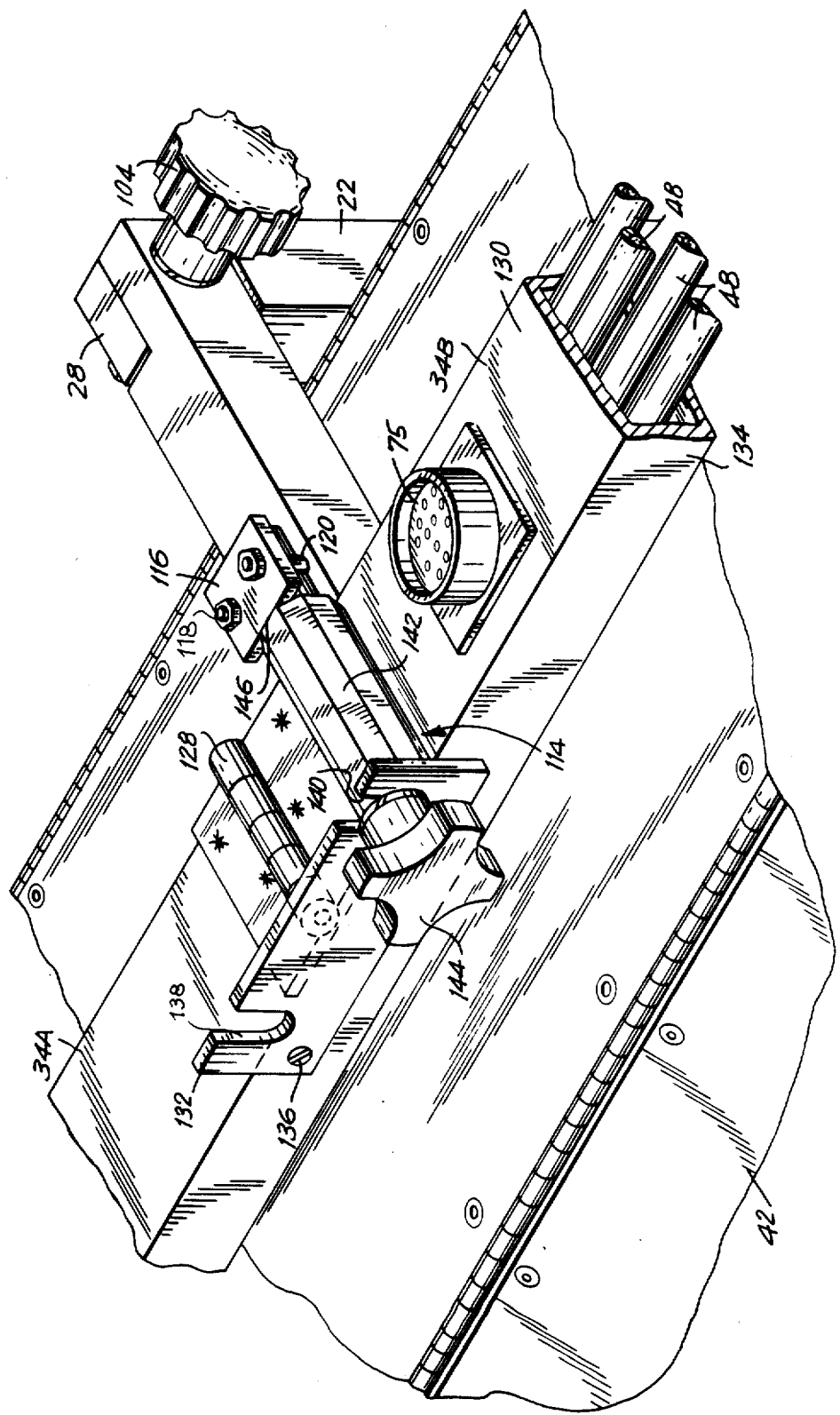

FLUORESCENT LIGHT MOUNTING SYSTEM

This application relates generally to a fluorescent light mounting system and more particularly to an adjustable ultrahighlight fluorescent fixture system of the type used in filming in color.

BACKGROUND OF THE INVENTION

Filming in color requires ultrahighlight intensity and particular selected concentration of the light. Fluorescent tube fixtures presently in use do not have the easy adjustability needed for filming. A typical type of fluorescent fixture known in the art is the Mole-Richardson eight-tube fixture, type 4411, that is mounted on a wheeled stand. The head of the fixture is is provided with a horizontal cross-pivot so that the head can be rotated, so that the light can be directed relatively upwards or downwards. The head is heavy, since the ballast that accompanies all fluorescent units is mounted in the head along with the fluorescent tubes. Ballast, as known, contains resistance used to stabilize the current in the fluorescent circuit and includes switches, circuit breakers and transformers. In summary, the typical ultrahighlight fluorescent fixture known in the art is cumbersome, difficult to direct generally, and difficult to adjust to demands in small variations in lighting requirements.

SUMMARY OF THE INVENTION

Accordingly, it is an object of the present invention to provide a lightweight softlight mounting system that is easily adjustable in a multiple of positions.

It is a further object of the present invention to provide a softlight mounting system that is lightweight easily adjustable, and capable of being collapsed into an easily stored and transportable unit.

It is still another object of the present invention to provide a softlight mounting system as a fluorescent light mounted on a lightweight head that fits on a standard light stand and is easily adjusted over a wide range of positions on the stand.

It is yet another object of the present invention to provide a light reflector apparatus having a lightweight, easily adjustable head unit capable of carrying several fluorescent tubes and having a ballast unit separate from the head unit.

In accordance with the above objects, there is provided a stand, such as a tripod, set upon a horizontal surface, the stand having a top end portion; a light shield, or reflector, of the type having a pair of barn doors; at least one and preferably a plurality of fluorescent light tubes set in front of the reflector; a source of electrical power; electrical cable and receptacles connected to the fluorescent light tubes; an electrical cable connector means between the source of electrical power and the electrical cable and receptacles; and an elongated head, or mounting member, capable of holding the fluorescent light tubes, the light reflector and the electrical cable and receptacles. The elongated mounting member includes an elongated housing that surrounds the electrical cable connectors. An upright first post having opposed upper and lower ends is removably connected to the top end portion of the tripod, and a second post having opposed first and second ends has its first end connected to the upper end of the first post and its second end connected to the center area of the elongated dimension of the mounting member. A first swivel connector pivotably connects the lower end of the first post and the top end portion of the tripod stand, wherein the first post can be selectively set at a first selected position over 360 degrees on a plane approximately parallel with the surface on which the tripod is set, the first swivel connector including a first locking apparatus that is capable of clamping and unclamping the first post at and from the first position. A second swivel connector pivotably connects the first end of the second post and the mounting member, wherein the mounting member can be selectively set at a second position over 360 degrees on a plane generally perpendicular to the second post. The second swivel connector includes a second locking apparatus that is capable of clamping and unclamping the second post at the second position. The system also includes a rotatable device that is capable of connecting the first end of the second post with the upper end of the second post, wherein the second post can be selectively set at a third position on a plane generally perpendicular to the horizontal surface over approximately 180 degrees measured between opposed positions of the second post generally parallel with the horizontal surface. The rotatable device includes a third locking apparatus that is capable of clamping and unclamping the second post at and from the third position.

The ballast is contained in a container remote from the head, or mounting member. The mounting member is thus relatively lightweight. This enables the head to be maneuvered to a multiplicity of positions in response to lighting requirements. The entire system can be disassembled and placed in carrying cases.

The present invention will be better understood and the objects and important features, other than those specifically set forth above, will become apparent when consideration is given to the following details and description, which when taken in conjunction with the annexed drawings, describes, discloses, illustrates, and shows preferred embodiments or modifications of the present invention and what is presently considered and believed to be the best mode of practice in the principles thereof. Other embodiments or modifications may be suggested to those having the benefit of the teachings herein, and such other embodiments or modifications are intended to be reserved especially as they fell within the scope and spirit of the subjoined claims.

BRIEF DESCRIPTION OF THE DRAWINGS

The invention will now be described with reference to the accompanying drawings, wherein:

FIG. 1 is a perspective view of the reflector apparatus with the head unit in a horizontal position and with the head mount shown in phantom lines in a vertical position;

FIG. 2 is a view taken through line 2—2 of FIG. 1;

FIG. 3 is a view taken through line 3—3 of FIG. 1;

FIG. 4 is a view taken through line 4—4 of FIG. 1;

FIG. 5 is a view taken through line 5—5 of FIG. 4;

FIG. 9 is a perspective fragmentary view of the head unit shown in the forward bent downwards position shown in FIG. 8.

DESCRIPTION OF THE PREFERRED EMBODIMENTS

Figure 6:
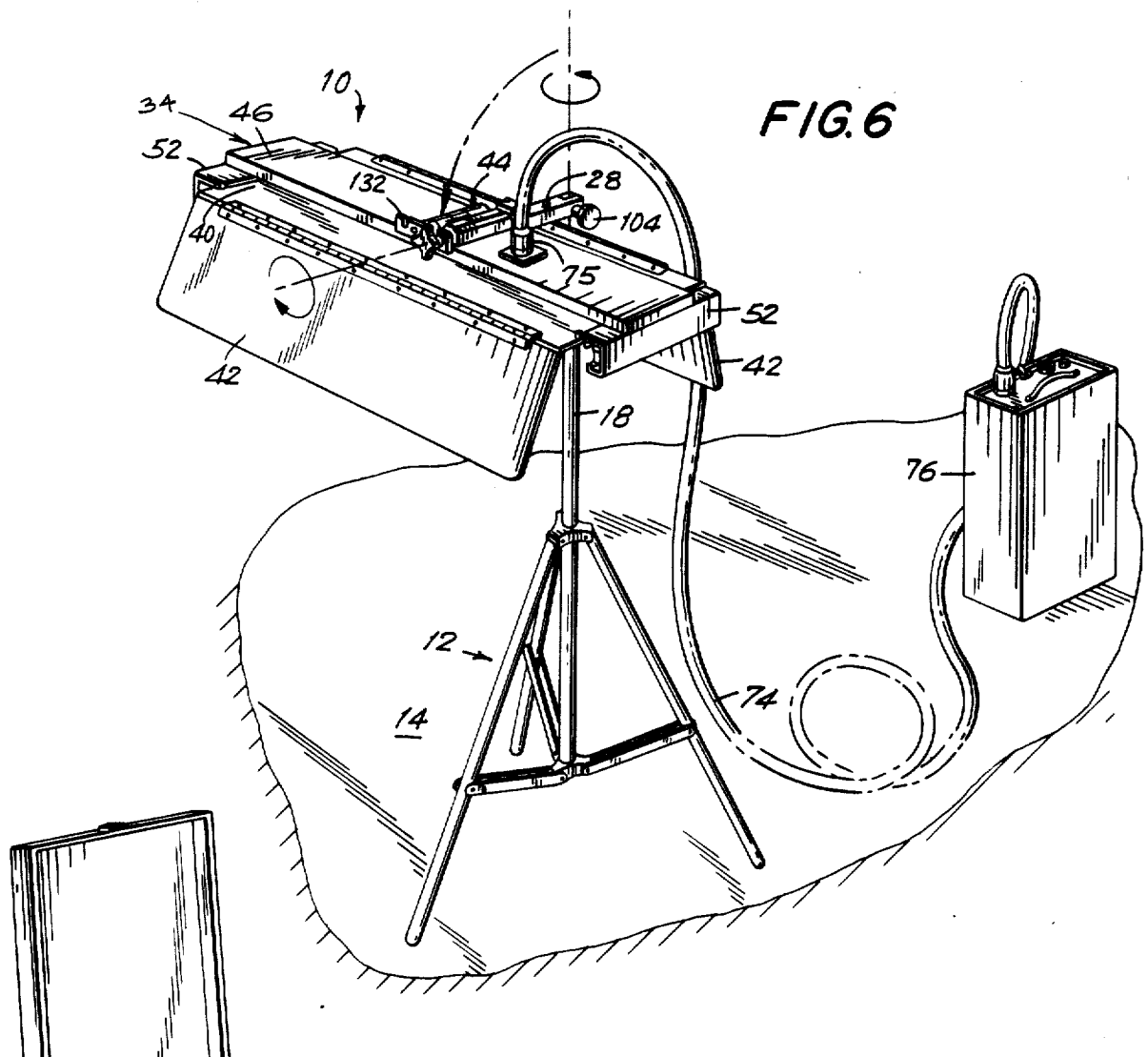
FIG. 6 is a perspective view of the mounting system with the head unit bent forward with the lights turned directly downwards.

Reference is now made in detail to the drawings.

An ultrahighlight fluorescent system 10 is shown in perspective view in FIG. 1 in a typical position ready for use. A tripod stand 12 of a type known in the art is set upon a horizontal flat surface 14 such as a floor. Stand 12 has a lower portion that includes legs 16 and a vertical mount 18 secured to the stand; mount 18 has a top end portion 20. A vertical, or upright, first post 22 having opposed upper and lower ends 24 and 26, respectively, is removably connected by way of lower end 26 to top end portion 20 of stand 12 as seen in FIGS. 4 and 5 in a manner to be explained below. A second post 28 having opposed first and second ends 30 and 32 respectively is rotatably connected by way of first end 30 to upper end 24 of first post 22 also in a manner to be explained below.

An elongated mounting member 34 holds four elongated horizontally disposed, vertically stacked, fluorescent light tubes 36 in parallel relationship and a light shield, or reflector, 38 capable of reflecting the light from said tubes.

Reflector 38 includes substantially flat, rectangular reflecting elements. Light reflector 38 includes a pair of flaps, or barn doors, 42 suitably treated with a light reflecting material and rotatably connected to flat portion 40 by hinges 44 to the opposed upper and lower edges of rectangular flat portion 40. Each door 42 is movable between a position wherein the door is on a plane with portion 40 and a position that forms an angle less than 180 degrees with flat portion 40 so as to better control the light focused upon the subject reflected from fluorescent tubes 36. Hinges 44 are adapted to remain biased in the position in which they have been moved in a manner known in the art. Mounting member 34 is removably connected to second end 32 of second post 28, also in a manner to be explained.

Mounting member 34 forms an elongated housing 46 that encloses four electrical cables 48 that are electrically connected in a manner known in the art to four pairs of opposed electrical receptacles 50 that are adapted to receive the end plugs of the four fluorescent light tubes 36. Receptacles 50 in the preferred embodiment are stacked vertically when system 10 is upright as seen in FIG. 1. As shown in FIG. 2 and seen in FIG. 1, a pair of protective vertical facing end compartments 52 enclose receptacles 50.

Each compartment 52 is enclosed on three sides by an end plate 54 and a pair of opposed side plates 56 one of which is connected to the vertical inner wall 58 of housing 46. Vertical front and rear flanges 60 are connected to the inner edges of side plates 56 leaving a vertical space for passage of tubes 36. As indicated in FIG. 2, vertical cable connection boxes 62 are received to end plates 54; box 62 is also supported by a vertical support 64 connected to end plate 56 and the side plate 56 connected to front wall 58 of housing 46. As shown in FIG. 3, reflector 38 is mounted vertically with mounting member 34 in the upright position as shown in FIG. 1, with flat portion 40 being lateral to and spaced behind the stacks of fluorescent tubes 36. Reflector 38 removably mounted to housing 46 with the side edges 66 of flat portion 40 adapted to slide downwards into a pair of vertical slots 68 formed in a pair of rectangular mounting blocks 70 that are secured to front wall 58 of housing 46 and to the rear flange of flanges 60. The cross-length of flat portion 40 is slightly greater than the cross-length of doors 42 so that the downward-side door does not overlap into mounting blocks 70 during the assembly and disassembly of reflector 38 from mounting member 34. As seen in FIG. 3, a pair of stop pins 72 extend rearwardly from the top sides of flat portion 40 so as to meet the top of mounting blocks 70, shown as preferably beveled inwardly.

An electrical connecting cable 74 at the fluorescent unit extends from cables 48 to which it is connected in a known manner via receptacle 75 (FIGS. 6 and 9) to ballast container 76, which contains the resistance used to stabilize the current in the circuit and which is in turn connected to a source of electrical power (not shown). Ballast container 76, as seen in FIGS. 1 and 6, is remote and separate from mounting member 34. Ballast container 26 holds the switches, circuit breaker, and transformers needed to stabilize the current in the electrical system.

System 10 is capable of being adjusted to various positions by an operator. A first adjustment can be made at a swivel connector 78, which pivotably connects lower end 26 of first post 22 and top end portion 20 of stand 12, wherein first post 22 can be selectively positioned over 360 degrees on a plane approximately parallel with surface 14. Swivel connector 44 includes a locking apparatus 80 that is capable of clamping and unclamping first post 22 at and from the selected position. As seen in FIGS. 4 and 5, swivel connector 78 includes an upright cylindrical swivel piece 82 that is connected to top end portion 20 of stand 12. Lower end 26 of first post 22 forms a vertical cylindrical chamber that is adapted to rotatably receive swivel piece 82. Locking apparatus 80 includes a screw 86 having opposed ends with a handle 88 at one end. Lower end 26 of first post 22 forms a transverse bore 90 that extends through one wall of chamber 84; bore 90 forms internal threads adapted to mate with the threads of screw 86. A spacer member 92 connected to handle 86 is positioned between the wall of chamber 84 and handle 86 so that the tip of its screw can be pressed against swivel piece 82 with swivel piece 82 in turn being pressed against the opposite wall of chamber 84 upon turning handle 86, thus clamping first post 22 into a nonmovable position relative to stand 12. Upon unscrewing screw 86 from its pressing relationship with swivel piece 82, first post 22 is unlocked and can be swiveled about swivel piece 82 to any selected position at which it can be once again locked into an non-rotatable mode.

A second adjustment of system 10 can be made by an operator at rotatable connector 94 between first end 30 of second post 28 and upper end 24 of first post 22 so that second post 28 can be selectively positioned on a plane generally perpendicular to the ground over approximately 180 degrees measured between opposed positions of second post 28 each of which is generally parallel with surface 14. FIG. 1 shows second post 28 in phantom lines having been rotated to one of its positions generally parallel with surface 14. A locking apparatus 62 is capable of locking second post 28 at any selected position within the range of its movement. It is to be understood that second post 28 could be so arranged and constructed so as to be capable of moving over an arc somewhat greater than the 180 degrees mentioned. As seen in FIGS. 4 and 5, second post 28 is upright and capable of moving mounting member 34 with reflector 38 90 degrees sideways as shown in phantom lines with element numerals shown with primes. In FIG. 6, second post 28 has moved mounting member 34 with reflector 38 90 degrees forward so that reflector 38 is aimed directly downwards. Rotatable connector 94 includes upper end 24 of first post 22 and second end 32 of second post 28 having overlapping portions, or tongues 98 and 97, respectively, forming a pair of recesses capable of receiving tongues 98 and 97, which form coextensive bores 106 generally transverse with surface 14. A bolt 102 having a handle 104 at one end and threads at the opposite end extends through both bores 100. A spacer member 106 connected to handle 104 is positioned between handle 104 and one of overlapping tongues and a nut 108 threaded onto bolt 102 at the other of said tongues. When second post 28 is rotated about bolt 102 relative to first post 22 to a selected position and bolt 102 is rotated onto nut 108 by way of turning handle 104, overlapping portions or tongues 97, 98 are pressed together between spacer member 106 and nut 108 into a locked mode. Bolt 102 can likewise be rotated from nut 108 so as to release tongues 97, 98 into an unlocked mode.

A third adjustment of system 10 can be made by an operator at a swivel connector 110, which pivotably connects first end 30 of second post 28 with mounting member 34 wherein mounting member 34 can be selectively positioned over 360 degrees on a plane perpendicular to second post 28. Swivel connector 110 includes a locking apparatus 112 that is capable of clamping, or unclamping, mounting member 34 and second post 28 at, or from, the selected position. Swivel connector 110 includes a cylindrical swivel piece 114 that is connected to mounting member 34 approximately midway along the length 116 of the mounting member, that is, the distance between slots 68. Swivel piece 114 extends transversely from mounting member 34 generally parallel to second post 28. As shown most clearly in FIGS. 4 and 5, swivel connector 110 includes a locking wall 116 generally parallel to and proximately spaced from second post 28. Locking wall 116 has opposed end portions, a mounting screw 118 being disposed at one end so as to secure that end of wall 116 to second post 28, the other opposed end being movable relative to second post 28.

A cylindrical cross-bolt 120 forming threads at one end and having a handle 122 at the opposite end is positioned in a cylindrical bore through second post 28 lateral to locking wall 116 and generally lateral to mounting screw 118. A nut 124 integral with the movable end of locking wall 116 is adapted to receive the threaded end of cross-bolt 120. Cross-bolt 120, mounting screw 118, locking wall 116, and second post 28 forms a cavity, or chamber, 126 adapted to slidingly receive swivel piece 114 of mounting member 34, with swivel piece 114 being rotatably movable with cavity 126. Cross-bolt 120 is capable of being screwed via handle 122 in its bore into engagement with the nut 124 so as to draw the movable end of locking wall 116 towards second post 28 and thus to press swivel piece 114 into locked engagement within cavity 126. Swivel piece 114 can be freed from its locked mode by unscrewing cross-bolt 120 from nut 124, so that mounting member 34 with reflector 38 and tubes 36 can be rotated along a 360 degree arc on a plane generally perpendicular to second post 28.

In addition, when swivel connector 110 is in its unlocked mode, that is, when cross-bolt 120 has been loosened from nut 124 so as to free locking wall 116 from its pressure on swivel piece 114, mounting member 34 can be lifted from second post 28 with swivel piece 114 sliding from cavity 126. Reflector 38 can also be raised upwardly and slid from slots 68 and so freed from its engagement with mounting member 34. Doors 42 can be folded inwardly to flat portion 40 so as to form a compact unit.

Mounting member 34 is made into two portions, 34A and 34B, separated at hinge 128, which is disposed transversely across the rear wall 130 of housing 46 as oriented in FIG. 1; hinge 138 is seen disposed upwardly in the detailed illustration of FIG. 9, where second post 28 is bent into a horizontal position. Portions 34A and 34B are seen most clearly in FIG. 9 where they are shown in their extended position. A locking bar 132 is secured to top wall 134 with a screw suitable and rotatably secured to the end of the hinge pin of hinge 128. Locking bar 132, which extends beyond rear wall 130, forms a pair of slots 138 and 140, which are disposed proximate and remote from screw, open toward rear wall 130, and have curved bottom portions which are level with the surface of rear wall 130. Swivel piece 114, described earlier in relation to swivel connector 110, is positioned within an elongated, hollow support 142 which forms internal threads. Swivel piece 114 forms external threads which mate with the internal threads. The end of swivel piece 114 above top wall 134 is provided with a handle 144. It is noted that support 142 has a projecting portion 146 that sets against the top of locking wall 116.

As shown in FIGS. 4 and 5, the top of support 142 is flush with the bottom wall 148 of housing 46 and with the bottom side of support 142. As noted above, mounting member 34 including housing 46 can be removed from second post 28 by lifting mounting member 34 with its engagement with swivel piece 114 when swivel connector 30 is in its unlocked mode. Likewise, mounting member 34 can be assembled to second post 28 by setting swivel member 114 into cavity 126 of swivel connector 110, rotating mounting member 34 to a selected position, and thereupon tightening cross-bolt 120 via handle 122 to lock swivel member 114 in cavity 126 and thus place swivel connector 110 in a locked mode at the selected position.

After mounting member 34 has been removed from second post 28, handle 122 is rotated so as to unscrew swivel piece 114 outwardly from threaded support 142 sufficiently to free locking bar 132 from its pressing relationship, or locked mode, with spacer member 145 so that portion 34B can be rotated into adjacent relationship with portion 34A into the disassembled mode of mounting member 34 with support 142 being rotated from its assembled position in slot 140 at the free end of locking bar 132 to its disassembled position in slot 140 at the secured end of locking bar 132.

At this time, swivel piece 114 can be rotated into threaded support 142 so as to press spacer member 145 against locking bar 132 so as to lock portions 34A and 34B into their disassembled mode.

First and second posts 22 and 28 can be disassembled from tripod 12 by turning handle 88 at swivel connector 78 and unscrewing screw 86 from locking pressure against swivel piece 82. Thereupon, first post 22, along with second post 28, can be lifted so as to separate swivel piece 82 from chamber 84. Thereupon, handle 104 is turned so as to free bolt 100 from nut 108; and then bolt 100 is slid from its associated bores so as to leave first and second posts 22 and 28 separated one from the other.

Figure 7:
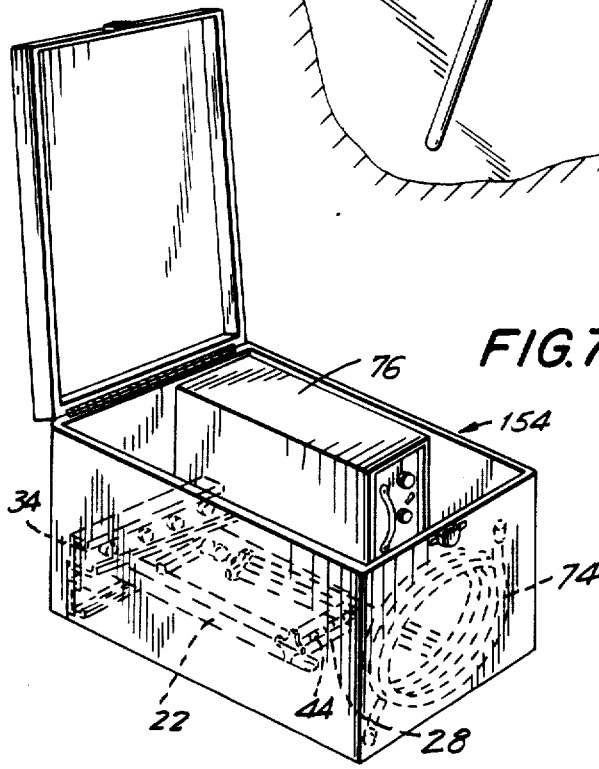
FIG. 7 is a perspective view showing the head unit bent into a dismounted mode in a carrying case along with the ballast.
Figure 8:
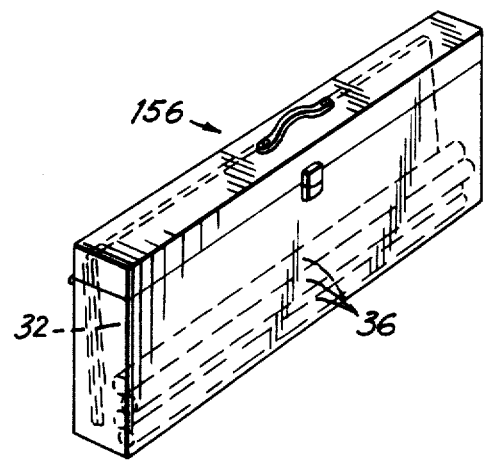
FIG. 8 is a perspective view of the reflector unit with the fluorescent tubes in a carrying case.

Tripod 12 can be disassembled in a manner known in the art. That is, tripod legs 16 are pulled together into close relationship with vertical mount 18. Locking device 150 and 152, shown in FIGS. 4 and 5, can be loosened so as to release a vertical sliding height adjusting rod. FIGS. 7 and 8 show packing cases 154 and 156, respectively. In case 154, there is fitted the disassembled and folded mounting member 34, first and second posts 22 and 28, the latter lying crosswise in the case, tripod 12, connecting cable 74, and ballast container 76. Case 156 contains light reflector 38 and disassembled fluorescent light tubes 36.

Figure 10A:
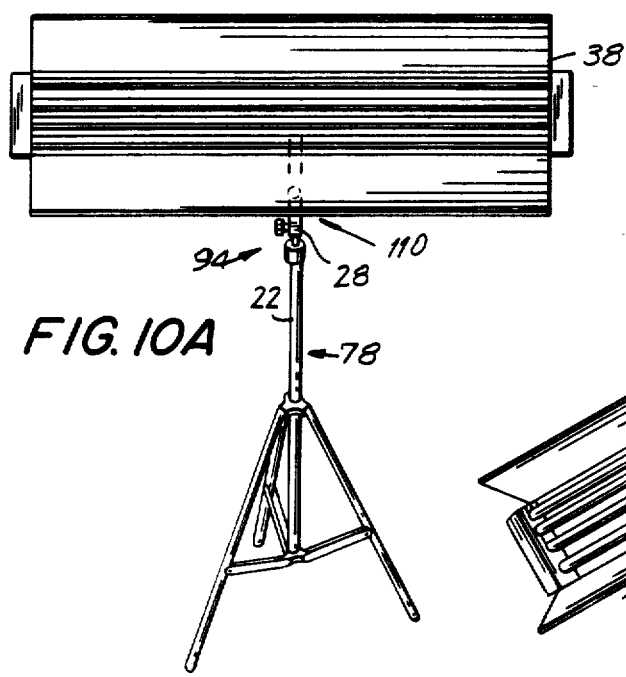
FIGS. 10A, 10B, 10C, 10D and 10E schmatically show the invention over a range of successive positions.
Figure 10B:
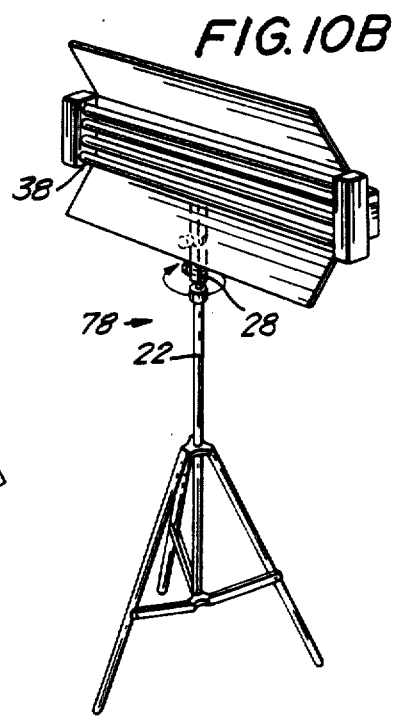
Figure 10C:
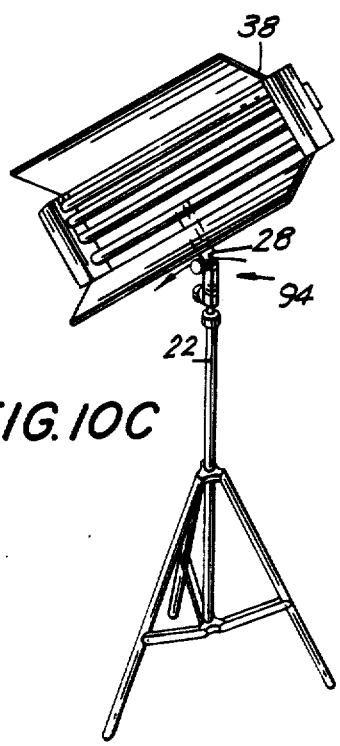
Figure 10D:
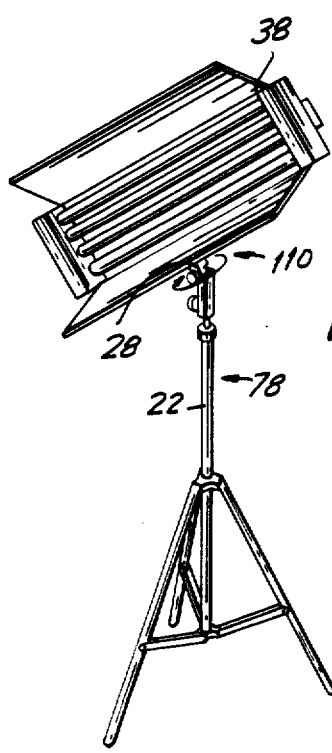
Figure 10E:
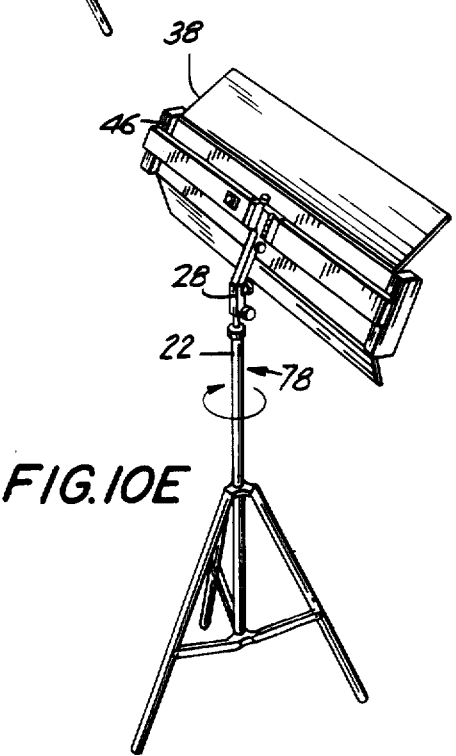

FIGS. 10A, 10B, 10C, 10D and 10E show in schematic form a series of random, but illustrative adjustments possible with the present invention. FIG. 10A shows system 10 erect and with reflector 38 facing outwardly with doors 42 slightly folded. Lower swivel connector 78, rotatable connector 94, and upper swivel connector 110 are shown in vertical alignment. FIG. 10B shows system 10B after having been swiveled at lower swivel connector 78 in a clockwise direction as viewed downwards. FIG. 10C shows the system after rotatable connector 94 having been tilted to the left as viewed. It is to be noted that the vertical plane of rotation of rotatable connector 94 is implicitly indicated as being generally at right angles to the viewer, which would not usually be the case. FIG. 10D shows the system after having been swiveled at upper swivel connector 110 in a clockwise direction as viewed downwards. FIG. 10E shows a further clockwise swivel at connector 78 so that housing 46 at the rear of mounting member 34 is seen rather than the front of reflector 38. Clockwise swivels are shown only for continuity. The range of possibilities of positioning the direction of reflector 38 is, of course, so wide as to be indicated only way of random example.

It will be recognized that the inventive system permits higher output tubes to be employed, such as 115 watts, as compared to 40 watts of the prior art 4411 fixture. Also, the inventive system embodies spring-loaded sockets in lieu of the typical conventional pin sockets of the same prior art device, which provides greater security of the tubes and permits articulated manipulation of the lighting system in any orientation or position without fear of dislodging the tubes. Also, with such biased sockets, there are not bent or broken pins to be contended with as is usual with the aforesaid 40 watt tube fixture.

I claim:

1. An ultrahighlight fluorescent light system comprising in combination, a stand member adapted to set upon a horizontal surface, said stand member having a top end portion, light reflector means associated with illumination means having a plurality of elongated fluorescent light tubes arranged in parallel relationship and being mounted on an elongated mounting means, a source of electrical power, electrical cable means and receptacle means connected to said illumination means, electrical cable connecting means for connecting said electrical cable means and receptacle means with said source of electrical power, said elongated mounting means being a housing having an elongated mounting member with opposed receptacles capable of holding said fluorescent light tubes in said parallel relationship, an upright first post having opposed upper and lower ends, said lower end being connected to said top end portion of said stand member, a second post having opposed first and second ends, said first end being connected to said upper end of said first post and said second end being removably connected to said mounting means, first swivel means for pivotably connecting said lower end of said first post and said top end portion of said stand member, wherein said first post can be selectively positioned over 360° on a plane approximately parallel with the horizontal surface, said first swivel means including first locking means for removably clamping and unclamping said first post at and from a first selected position, second swivel means for pivotably connecting said first end of said second post and said mounting means, wherein said mounting means can be selectively positioned over 360° on a plane generally perpendicular to said second post, said second swivel means including second locking means for clamping and unclamping said mounting means at and from a second selected position, rotating means for connecting said first end of said second post with said first post, wherein said second post can be selectively positioned on a plane generally perpendicular to a horizontal surface over approximately 180° measured between opposed positions of said second post generally parallel with the horizontal surface, said rotating means including third locking means for removably clamping and unclamping said second post at and from a third selected position, and said elongated mounting member having a length that extends perpendicular to said second post, said elongated mounting member comprising a pair of mounting portions approximately equal in said length, and a hinge member rotatably joining said pair of mounting portions; wherein said pair of mounting portions are movable between a fully extended position to said length and a folded position wherein each of said pair of mounting portions are folded in adjacent relationship.

2. A system according to claim 1, further including ballast means remote from said stand member and said mounting member, said ballast means being for stabilizing the current in the circuit between said source of electrical power and said fluorescent light tubes.

3. A system according to claim 1, further including fourth locking means for removably clamping and unclamping said pair of mounting portions in and from said fully extended position.

4. A system according to claim 3, wherein said first swivel means includes an upright first cylindrical swivel piece connected to said top end portion of said stand member, said lower end of said first post forming a first generally vertical cylindrical chamber adapted to rotatably receive said first swivel piece; said first locking means including a screw member having opposed ends having a first handle at one end, said lower end of said first post forming a transverse bore extending through one wall of said chamber and forming threads adapted to mate with the threads of said screw member, said bore being adapted to receive said screw member, and a spacer member connected to said handle and positioned between said wall of said first chamber and said first handle, whereby when said handle is turned so as to press the other end of said screw member against said upright piece and pressing said first swivel piece against an opposite wall of said first chamber, said first post is clamped into a nonmovable position relative to said stand member.

5. A system according to claim 4, wherein said second swivel means includes a second cylindrical piece connected to said elongated mounting member closely spaced from said hinge member and extending transversely from said mounting member generally parallel to said second post;

said second swivel means including a locking wall generally parallel to and proximately spaced from said second post, said locking wall having opposed ends, a mounting screw being disposed at one opposed end so as to secure said one end of said locking wall to said second post, the other of said opposed ends being movable relative said second post; said second locking means including a cylindrical cross-bolt forming threads at one end and having a handle at the opposite end, said second post forming a cylindrical bore through said second post lateral to said locking wall and generally lateral to and spaced from said mounting screw, and a nut integral with said movable end of said locking wall adapted to receive the thread of said cross-bolt; said cross-bolt, said mounting screw, said locking wall, and said second post forming a second chamber adapted to slidingly receive said second cylindrical piece of said mounting member, said second cylindrical piece being rotatably movable within said second chamber, said cross-bolt being capable of being screwed in said bore into engagement with said nut so as to draw said movable end of said locking wall towards said second post and to press said second cylindrical piece into a locked engagement within said second chamber.

6. A system according to claim 5, wherein said rotating means includes said upper end of said first post and said second end of said second post having a pair of overlapping portions and forming recesses capable of receiving said overlapping portions, said overlapping portions forming coextensive bores generally transverse with a support surface, and a bolt having opposed ends with a handle at one end and threads at the other, said bolt extending through said bores, said handle having a spacer member positioned between said handle and one of said overlapping portions, and a nut threaded onto said bolt at the other of said overlapping portions, wherein said second post is capable of being rotated about said bolt relative to said first post to a selected position and said bolt is capable of being rotated into said nut so as to press said overlapping portions into a locked mode.

7. A system according to claim 6, wherein said housing includes a top wall and a rear wall and a support member connected to said rear wall and forming an internal threaded hole generally lateral to said second post, said second swivel piece of said second swivel means forming external threads adapted to mate with said internal threaded hole, said second swivel piece having a handle extending above said housing, and a spacer member connected to the bottom of said handle; said fourth locking means further including a flat locking bar positioned adjacent to said top wall of said housing and having opposed first and second end portions, said first end portion being connected to one of said pair of mounting portions of said housing and said second end portion being free, said hinge member having a hinge bolt, said hinge bolt being rotatably connected to said locking bar at a position between said end portions, said locking bar forming first and second slots extending to said top wall, said first slot being positioned at one of said pair of mounting portions and said second slot being positioned at the other mounting portion, said slots being adapted to receive said second swivel means, wherein when said second swivel means is positioned in said second slot, said pair of mounting portions are in said fully extended position, and when said second swivel means is positioned in said first slot, said pair of mounting portions are in said folded position, and second swivel means being capable of being screwed downwards or upwards into or from said threaded hole, respectively, so that said spacer members presses upon or drawn from said locking bar to achieve a locking mode or an unlocking mode, respectively, in either said fully extended position or said folded position.

* * * * *